Figure 1:
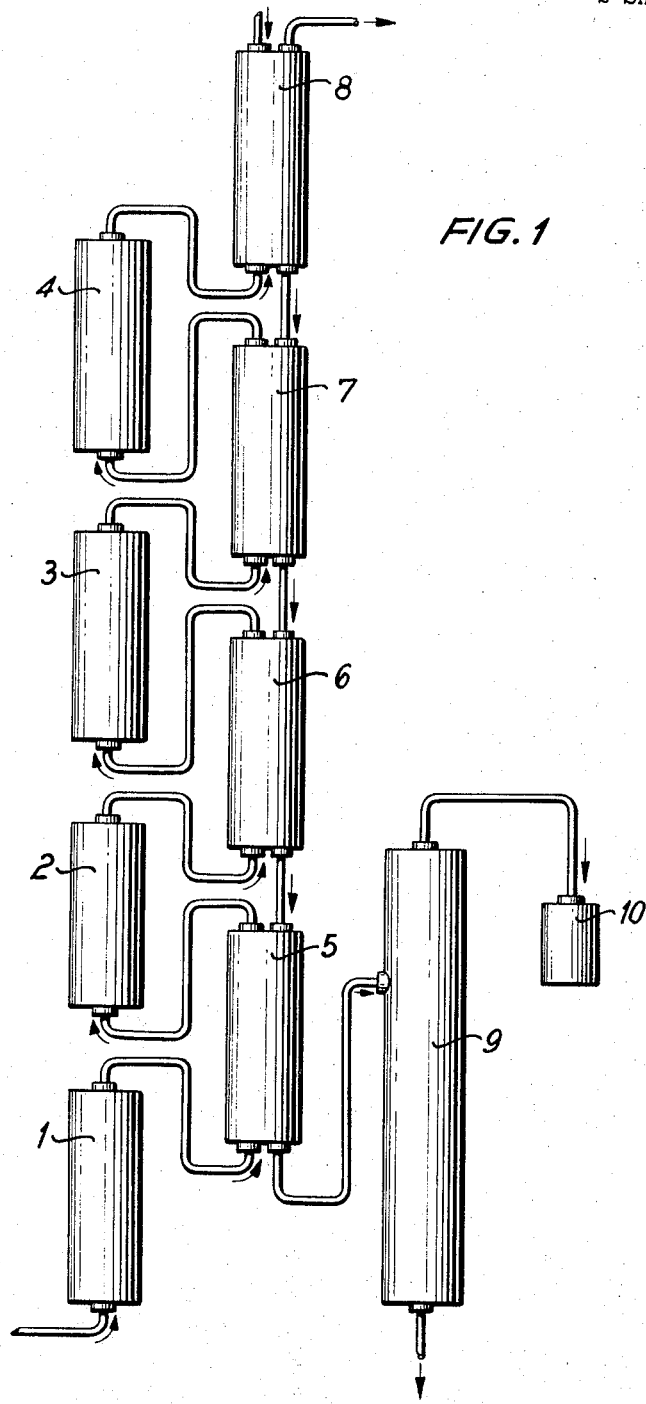

United States Patent Office 3,359,325
Patented Dec. 19, 1967

3,359,325
PROCESS FOR THE MANUFACTURE
OF ACROLEIN
Kurt Sennewald, Knapsack, near Cologne, Alexander Ohorodnik, Liblar, and Wilhelm Vogt, Knapsack, near Cologne, Germany, assignors to Knapsack Aktiengesellschaft, Knapsack, near Cologne, Germany, a corporation of Germany
Filed Oct. 8, 1965, Ser. No. 494,116
Claims priority, application Germany, Oct. 22, 1964, K 54,319
18 Claims. (Cl. 260—604)

The present invention relates to a process for the manufacture of acrolein by oxidizing propylene with molecular oxygen, which is used e.g. in the form of air, in the presence of steam and in contact with a catalyst.

Acrolein is a valuable starting product for the manufacture of acrylic acid derivatives, allyl alcohol, hexane diol, hexane triol and other products. Special importance is therefore attached to the development of processes permitting the production of acrolein under economical conditions.

In German specification (DAS) 1,125,901 there is described a process for making acrolein, wherein propylene admixed with 1 to 10 times the molar amount of steam is reacted with oxygen, preferably with 1 to 2 times the molar proportion of oxygen, which is used e.g. in the form of air, at temperatures of between about 230° C. and 500° C., at a pressure within the range of about 0.1 to 5 atmospheres absolute, and for a period of time of about 0.2 to about 5 seconds over catalysts consisting of an oxide mixture of the elements iron, bismuth, molybdenum and phosphorus and optionally applied to a carrier.

German specification (DAS) 1,137,427 describes a similar process but for continuous operation which is especially advantageous.

Propylene as an obligatory by-product of ethylene production is offered today in steadily increasing quantities at decreasing prices, naturally with basic consequences on all previous considerations how to produce acrolein under economical conditions. The facts to consider today appear to reside less in the yield-dependent expense of reaction components. They appear to reside more than ever before in the process and catalyst costs which result from losses and aging. This is one of the reasons why in contrast to former times one must deem discontinuous processes, wherein single passage admits of no more than of a very incomplete propylene conversion, but with relatively low expenditure of apparatus, or generally processes wherein the type of catalyst implies smaller conversion rates and acrolein yields, to be really competitive with or to be even more advantageous than continuous processes, or generally processes wherein high yields are only obtainable at the price of costly catalysts.

The present invention now unexpectedly provides a substantially more economic catalyst free from costly components, such as molybdenum and bismuth. In addition to being expensive, molybdenum had the disadvantage of gradually evaporating in oxide form at the reaction temperatures, whereas manipulation of toxic bismuth was not harmless physiologically.

The catalyst according to this invention comprises an oxide mixture of the elements vanadium, tin and phosphorus, applied to a carrier, e.g. silica gel, aluminum oxide, pumice or aluminum phosphate. This catalyst is relatively very cheap, resistant to abrasion, ensures the reaction to proceed selectively, and has a low bulk density of 0.3 to 0.4 g./cc.

The catalyst described above, which contains the active elements in an atomic ratio of about $V_1Sn_{4.5-10}P_{2-10}$, enables even in discontinuous processes obtaining acrolein in a yield of 80 to 85%, referred to the propylene of which a proportion of up to 90% undergoes conversion.

It has been found that the catalyst of this invention which contains $V_2O_5$, $SnO_2$, $P_2O_5$ and optionally a carrier unexpectedly behaves in a manner other than conventional catalysts with respect to the reaction components displaying an oxidizing or reducing effect. Actually, the catalyst is reduced steadily and alternately in the usual manner during the reaction by propylene to the oxide stages of $V^{II-IV}$ and $Sn^{II}$ and optionally to even the metal stage, and successively re-oxidized by oxygen. But as opposed to Mo-Bi catalysts, e.g. the oxidic Fe-Bi-P-Mo catalyst described in German specification 1,137,427, which produce maximum yields with an equimolar propylene to oxygen ratio, and preferably with a deficiency of oxygen—where the catalyst components are predominantly in the low (reduced) valence stages—the oxidic V-Sn-P catalyst of this invention produces optimum results with an excess of oxygen, Vanadium and tin are therefore predominantly in the highest valence stage ($V^V$, $Sn^{IV}$) during the reaction, that is to say that the catalyst is most active in the oxidized form. It has generally been ascertained that the acrolein yield increases as the oxygen content in the reaction mixture increases.

The catalyst of the present invention can be used in a solid bed or more preferably in a flowing or fluidized bed.

When it is intended to produce acrolein discontinuously with the V-Sn-P catalyst not previously used for that purpose by single passage with no unreacted propylene being recycled, it is nonetheless convenient to carry out the process as a multiple stage reaction in a multiple stage reactor, which will be described hereinafter with reference to the accompanying drawing, FIG. 1.

Reaction stage 1, which in the same way as the series-connected reaction stages 2, 3 and 4, is filled with the present catalyst, is charged with air, propylene and steam at a temperature of 420 to 520° C. and resulting acrolein is removed together with minor amounts of acetaldehyde and acrylic acid in water scrubbing stage 5. The off gas consisting of unreacted propylene, air, steam, nitrogen, hydrogen and carbon oxides is introduced into reaction stage 2. Acrolein formed in reaction stage 2 is removed by scrubbing in scrubbing stage 6 until the completely reacted off-gas ($N_2$, $O_2$, $CO_2$, $H_2O$, $H_2$) ultimately escapes at the head of scrubbing stage 8, whereas the acrolein formed in all four stages is withdrawn in the form of an aqueous solution at the lower end of scrubbing stage 5 to be separated in conventional manner from its by-products in distilling stage 9. An about 95% crude acrolein is obtained in receiver 10; the balance consists of water, acetaldehyde, traces of acrylic acid and dissolved $CO_2$.

As scrubbing in stages 5 to 8 is carried out at 10 to 50° C., steam such as initially supplied undergoes a condensation as early as in scrubbing stage 5. However, propylene-containing off-gases such as entrained into reaction stages 2 to 4 are saturated with steam. Fresh steam may also be added before each of the reaction stages 2 to 4. For energetic reasons, it is also advantageous to ensure a heat exchange between the hot reaction gases coming from reaction stages 1 to 3 and the cooled off-gases coming from scrubbing stages 5 to 7.

The arrangement described above permits obtaining for a single passage propylene conversion rates of 85 to 90% and acrolein yields of 80 to 85%.

The length of the single reactor stages 1 to 4 may vary between 0.5 to 3.0 meters in functional relationship with the throughput or flow velocity of the gases. The single reactor stages are normally 0.5 to 2.0 meters long, which means a customary reactor length of 2 to 10 meters for four to five stages.

The multiple stage reaction with its associated scrubbing stages described above enables the acrolein of limited stability at elevated temperatures (about 400° C.) in the presence of an oxidation catalyst and oxygen to be removed immediately after formation thereof from the reaction mixture and to be prevented from further oxidation.

The process of the present invention for making acrolein with the use of a V-Sn-P catalyst can also be carried out continuously in a manner similar to the process disclosed in German specification (DAS) 1,137,427, and then enables quantitative conversion rates for propylene to be obtained. Technically, the present process distinguishes basically in the use of an excess of oxygen from conventional methods. The process disclosed in German specification (DAS) 1,137,427 which uses a Fe-Bi-Mo-P catalyst comprises cycling substantially the propylene in excess, where oxygen alone, but no air, can be employed for oxidizing the propylene, because otherwise it would be necessary for each passage to remove useless nitrogen ballast, naturally with corresponding propylene proportions, which would render continuous operation impossible.

As opposed thereto, when a V-Sn-P catalyst is used, it is possible to cause air or quite generally a gas mixture containing an excess of oxygen to flow in a cycle. The propylene, which is used in a molar deficiency from the start of the reaction, is rapidly transformed and useless "air" deprived of oxygen is removed after each passage without substantial proportions of propylene being lost. After each passage, the propylene is replenished.

Figure 2:
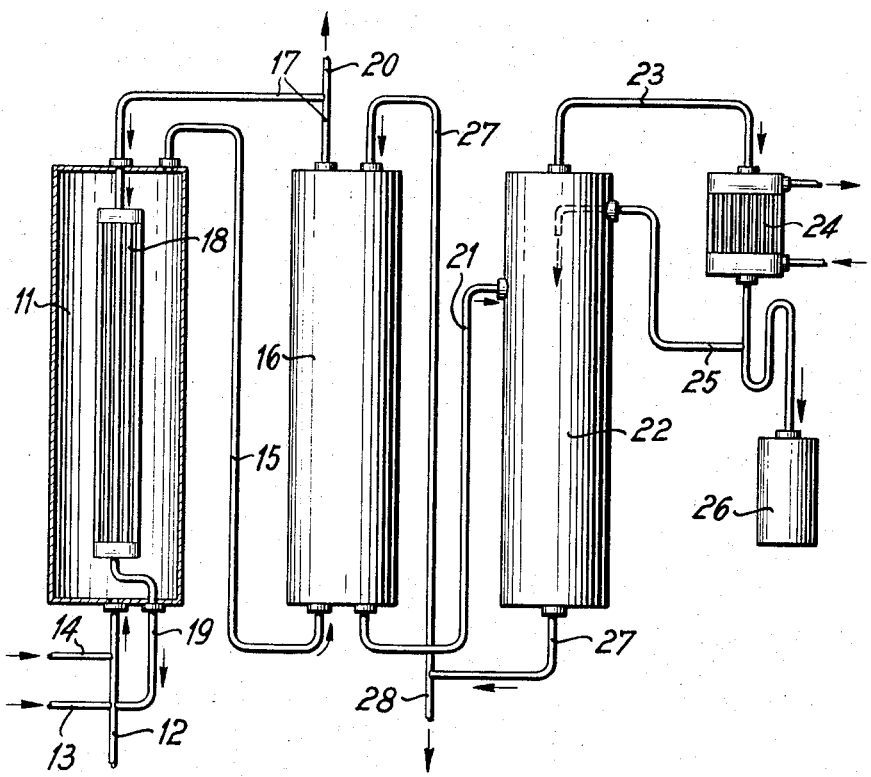

The process of the present invention will now be described with reference to the flow scheme shown in FIG. 2 of the accompanying drawings, i.e. the production of acrolein in a fluidized bed reactor.

A fluidized bed reactor 11 is charged through line 12 with propylene, through line 13 with steam and through line 14 with air, oxygen or an oxygen-containing gas. Acrolein-containing reaction gas is conveyed from reactor 11 through line 15 to scrubbing stage 16, wherein the acrolein is extracted from the gas phase in conventional manner. The reaction gas freed from acrolein is recycled through line 17, heat exchanger 18 which is placed in the reactor, and through line 19 after admixture of fresh propylene, steam and oxygen.

Carbon oxides, such as formed by propylene combustion, are removed from the cycle through off-gas pipe 20 together with a small proportion of unreacted propylene and oxygen.

The off-gas is composed approximately of:

| | Mol percent |
|---|---|
| Inert gas ($CO+CO_2+N_2+H_2$) | 70–80 |
| $O_2$ | 15–20 |
| Propylene | 5–10 |

Due to the good acrolein yield and due to the small propylene content of the off-gas, the loss of propylene accruing from the removal of the off-gas is smaller than 0.5%, referred to the propylene used. The aqueous acrolein solution is withdrawn near the bottom portion of scrubbing tower 16 and conveyed through line 21 to distilling stage 22. Crude acrolein is distilled and removed in the form of an azeotrope with water (about 52° C.) through line 23 and condensed in cooler 24. The resulting water and an acrolein portion are refluxed through line 25 to column 22, whereas the bulk of the crude acrolein is caused to flow into collecting tank 26. Matter removed near the bottom portion of column 22 is returned through line 27 to scrubbing tower 16 which is operated at a temperature of about 20° C. A portion of such matter is removed through waste water pipe 28.

Conventional dehydration and purification by distillation convert the crude product into pure acrolein having a purity of more than 99.0%.

The present invention provides more especially a process for making acrolein by oxidizing propylene, preferably with 1 to 3 times the molar amount of oxygen, which is used e.g. in the form of air, in the presence of steam, at a temperature of 230 to 600° C. and under a pressure of between 0.1 and 10 atmospheres absolute in contact with a catalyst, which is preferably applied to a carrier, such as silica gel ($SiO_2$), aluminum oxide, aluminum phosphate, pumice or a similar substance, which comprises carrying out the oxidation in contact with a catalyst containing an oxide mixture of the elements vanadium, tin and phosphorus.

The catalyst should preferably contain, per gram atom vanadium, 4.5 to 10 gram atoms tin and 2–10, advantageously 3–6, gram atoms phosphorus, each element in oxide form. The finished catalyst may contain about 50 to 90% by weight of a carrier, and the propylene-air-steam mixture is advantageously allowed to remain in contact with the catalyst for a period of time of 0.1 to 3, preferably 0.2 to 1 second. 5 to 15 mols steam should conveniently be used per mol propylene, and the oxidation should more especially be carried out at a temperature of 450 to 500° C.

For discontinuous operation, it is especially advantageous to carry out the process of the present invention as a multiple stage reaction, wherein reaction gases issuing from a first stage charged with the catalyst are freed in a following first water-scrubbing stage from acrolein and small proportions of by-products such as acrylic acid and acetaldehyde. The off-gases coming from the first water-scrubbing stage, which consist essentially of propylene, oxygen, steam, carbon oxides, hydrogen and optionally nitrogen, are caused, preferably while producing some heat exchange with the hot reaction gases coming from the first stage, to flow into a second stage charged with catalyst. The reaction gases coming from the second stage are freed in a following second water-scrubbing stage from acrolein and by-products, and the procedure is continued until the off-gases coming from the last, preferably a fourth water-scrubbing stage are removed. Aqueous crude acrolein coming from all of the water scrubbing stages is collected and purified by conventional distilling methods.

The process of the present invention can also be carried out as follows: the reaction stage charged with catalyst is continuously supplied with a cycled mixture of propylene and oxygen, optionally in the form of air, and steam, carbon monozide, carbon dioxide and hydrogen are added as diluting gas, and the gaseous reaction mixture leaving the reaction stage is conveyed to a water-scrubbing stage, wherein it is freed by being conducted counter-currently to cold water from acrolein and by-products, such as acetaldehyde and acrylic acid. Cycled gas will thereafter escape overhead, which is treated to remove, in the form of off-gas, any additional proportion of carbon oxides and hydrogen formed after each passage together with a corresponding proportion of unreacted propylene, oxygen and optionally nitrogen, and which is recycled to the reaction stage after admixture of fresh propylene, oxygen and steam. The aqueous solution withdrawn concurrently therewith near the bottom portion of the water-scrubbing stage is introduced, if desired after having been heated, into a distilling stage heated e.g. with steam, and aqueous matter removed near the bottom portion of the distilling stage is cooled and then conveyed to the head of the water-scrubbing stage. Crude acrolein is removed at the head of the distilling stage, successively purified by distillation, and dehydrated.

The following examples serve to illustrate the process of the present invention:

EXAMPLE 1

*Preparation of catalyst*

868 grams finely divided tin (grains, turnings or powder) were dissolved at a temperature not exceeding 20° C. in 6,200 grams 30% nitric acid. The resulting clear solution of tin nitrate was introduced immediately with agitation into 54 kg. of a 16% aqueous solution of colloidal silicic acid which contained 143.5 grams dissolved ammonium vanadate and 164 cc. 85% phosphoric acid. The resulting suspension was homogenized fairly rapidly, e.g. in a colloid mill, and stirred for about 1 hour at 90° C. with aqueous ammonia, which was used in a proportion sufficient to neutralize the phosphoric acid and to leave a slight excess of ammonia. The catalyst mass so prepared was dried and then sintered for 24 hours at 500–600° C. An atomization drying means is conveniently used for use of the catalyst in a flowing or fluidized bed process.

The catalyst was composed of:

| | Percent by wt. |
|---|---|
| $V_2O_5$ | 1 |
| $SnO_2$ | 11 |
| $P_2O_5$ | 2 |
| $SiO_2$ | 86 | and contained the elements in the atomic ratio of

V:Sn:P:Si=1:8:3:159

The catalyst was used in a grain size of 0.05 to 0.5 mm.

EXAMPLES 2 TO 6

Discontinuous one-stage process 100 grams of the catalyst prepared in the manner set forth in Example 1 were used in a fluidiezd bed reactor 5 cm. wide under the following reaction conditions, and the following results were obtained:

| Example | 2 | 3 | 4 | 5 | 6 |
|---|---|---|---|---|---|
| Mols air | 20 | 30 | 20 | 20 | 20 |
| Mols $H_2O$ | 15 | 15 | 15 | 30 | 30 |
| Mols propylene | 2.5 | 2.5 | 2.6 | 2.5 | 2.7 |
| Reaction temperature (° C.) | 450 | 500 | 480 | 480 | 490 |
| Reactor length (m.) | 2 | 1.5 | 1 | 0.5 | 0.5 |
| Sojourn time (sec.) | 3 | 1.9 | 1.45 | 0.6 | 0.58 |
| Propylene conversion rate in percent | 55.5 | 62.0 | 44 | 20 | 23 |
| Acrolein yield in percent, referred to conversion rate | 44.5 | 46 | 66 | 82.5 | 77 |

The catalyst activity was 300 to 400 grams acrolein/kg. catalyst hr.

EXAMPLE 7

Discontinuous four-stage process

A catalyst prepared in the manner set forth in Example 1 was introduced into a fluidized bed reactor comprising four series-connected reaction stages each 0.5 m. long (FIG. 1). Under the reaction conditions set forth in Examples 5 and 6, acrolein was obtained in a yield of 80–85% for propylene conversion rates of 80 to 90%.

EXAMPLE 8

Continuous cyclic process

A fluidized bead reactor 4 cm. wide and 1 m. high was charged with 100 grams of a catalyst prepared in the manner set forth in Example 1. 400 l./hr. reaction gas consisting of about 70 mol percent inert gas (CO, $CO_2$ and $H_2$), 20 mol percent oxygen and 10 mol percent propylene were cycled at a reaction temperature of 480° C. at atmospheric pressure. 1 mol propylene and oxygen in a proportion sufficient to maintain the oxygen concentration (about 20%) constant in the reaction mixture were added per hour. The recycle gas was also admixed before the reactor with about 500 grams steam. The yield was 85%, referred to the propylene used, for an apparent 1 second sojourn time of the reaction mixture in the reactor. Additional carbon oxides which had formed due to propylene combustion were removed in the form of off-gas together with the proportion of propylene and oxygen contained in the reaction gas. In the present example, the loss of material was about 1%, referred to the propylene initially used.

EXAMPLE 9

Continuous cyclic process

A reaction gas consisting of 90 mol percent inert gas (CO, $CO_2$ and $H_2$), 8.5 mol percent oxygen and 1.5 mol percent propylene was cycled under conditions analogous to those used in Example 8 in an identical reactor and with the same catalyst. The gas so composed produced an 88% yield of acrolein, while the loss of propylene due to removal of off-gas was 0.5%, referred to the propylene used. The oxygen can also be used in the form of air. In this case, the propylene content (1–3%) and oxygen content (2–5%) of the reaction mixture should be kept fairly small. Even increased yields can be obtained when air is used, but at the price of higher propylene losses due to removal of larger proportions of nitrogen.

We claim:

1. In the process for the manufacture of acrolein by oxidizing propylene with oxygen in the presence of steam, at a temperature of 230 to 600° C. and a pressure of 0.1 to 10 atmospheres absolute in contact with a catalyst, the improvement which comprises carrying out the oxidation with the use of a catalyst consisting essentially of an oxide mixture of the elements vanadium, tin and phosphorus in an atomic ratio of 1:4.5–10:2–10 respectively and a carrier.

2. A process as claimed in claim 1, wherein the elements vanadium, tin and phosphorus have an atomic ratio of 1:4.5–10:3–6 respectively.

3. A process as claimed in claim 1, wherein the carrier is a member selected from the group consisting of silica gel ($SiO_2$), aluminum oxide, aluminum phosphate and pumice.

4. A process as claimed in claim 1, wherein the catalyst contains the carrier in a proportion of about 50 to 90% by weight.

5. A process as claimed in claim 1, wherein the oxygen is used in a proportion about 1 to 3 times the molar proportion.

6. A process as claimed in claim 1, wherein the oxygen is used in the form of air.

7. A process as claimed in claim 6, wherein the propylene-air-steam mixture is allowed to remain in contact with the catalyst for a period of 0.1 to 3 seconds.

8. A process as claimed in claim 7, wherein the mixture is allowed to remain in contact with the catalyst for a period of 0.2 to 1 second.

9. A process as claimed in claim 1, wherein 5 to 15 mols steam are used per mol propylene.

10. A process as claimed in claim 1, wherein the oxidation is carried out at a temperature of 450 to 500° C.

11. A process as claimed in claim 1, wherein the oxidation is carried out discontinuously as a multiple-stage reaction which comprises conveying reaction gases issuing from a first reaction stage charged with the catalyst to a first water-scrubbing stage series-connected to said first reaction stage and freeing in said water-scrubbing stage the said reaction gases from acrolein and small proportions of by-products, which include acrylic acid and acetaldehyde, causing off-gases coming from the first water-scrubbing stage and consisting essentially of propylene, oxygen, steam, carbon oxides and hydrogen to flow into a second reaction stage charged with the catalyst, freeing reaction gases coming from the second reaction stage in a second water-scrubbing stage series-connected to said second reaction stage from acrolein and by-products, continuing such procedure until off-gases coming from a last water-scrubbing stage are removed, collecting crude acrolein coming from all of the water-scrubbing stages, and purifying the said acrolein by conventional distillation.

12. A process as claimed in claim 11, wherein the off-gases coming from the first water-scrubbing stage also contain nitrogen.

13. A process as claimed in claim 11, wherein the off-gases coming from the first water-scrubbing stage are introduced into the second reaction stage while producing some heat exchange with the hot reaction gases coming from the first reaction stage.

14. A process as claimed in claim 11, wherein the off-gases coming from a fourth water-scrubbing stage are removed.

15. A process as claimed in claim 1, wherein a reaction stage charged with the catalyst is continuously supplied with a cycled mixture of propylene and oxygen and with steam, carbon monoxide, carbon dioxide and hydrogen to serve as diluting gas; gaseous reaction mixture leaving the reaction stage is conveyed to a water-scrubbing stage, in which it is freed by being conducted counter-currently to cold water from acrolein and by-products which include acetaldehyde and acrylic acid; cycled gas is thereafter allowed to escape overhead, which is treated to remove, in the form of off-gas, any additional proportion of carbon oxides and hydrogen formed after each passage together with the corresponding proportion of unreacted propylene and oxygen, included in said cycled gas, which is recycled to the reaction stage after admixture of fresh propylene, oxygen and steam; aqueous solution withdrawn concurrently therewith near the bottom portion of the water-scrubbing stage is introduced into a distilling stage; aqueous matter removed near the bottom portion of the distilling stage is cooled and then conveyed to the head of the water-scrubbing stage; crude acrolein is removed at the head of the distilling stage, successively purified by distillation, and dehydrated.

16. A process as claimed in claim 15, wherein the oxygen is used in the form of air with the result that the off-gas removed then contains nitrogen.

17. A process as claimed in claim 15, wherein the aqueous solution removed near the bottom portion of the water-scrubbing stage is pre-heated and then introduced into the distilling stage.

18. A process as claimed in claim 15, wherein the distilling stage is steam-heated.

References Cited

FOREIGN PATENTS 507,347  11/1954  Canada.
908,655  10/1962  Great Britain.

LEON ZITVER, *Primary Examiner.*

R. H. LILES, *Assistant Examiner.*

UNITED STATES PATENT OFFICE
CERTIFICATE OF CORRECTION

Patent No. 3,359,325 December 19, 1967

Kurt Sennewald et al.

It is certified that error appears in the above identified patent and that said Letters Patent are hereby corrected as shown below:

Column 2, line 44 "($N_2$, $O_2$, $CO_2$, $H_2O$, $H_2$)" should read -- ($N_2$, $O_2$, $CO$, $CO_2$, $H_2O$, $H_2$) --. Column 4, line 46, "monozide" should read -- monoxide --.

Signed and sealed this 30th day of September 1969.

(SEAL)
Attest:

Edward M. Fletcher, Jr.
Attesting Officer

WILLIAM E. SCHUYLER, JR.
Commissioner of Patents